United States Patent [19]

Kim

[11] Patent Number: 5,214,544
[45] Date of Patent: May 25, 1993

[54] APPARATUS FOR GENERATING A TRACK ZERO SIGNAL IN A FLOPPY DISC DRIVER WITHOUT AN OPTICAL TRACK ZERO SENSOR

[75] Inventor: Jik Kim, Suwon, Rep. of Korea

[73] Assignee: SamSung Electronics Co., Ltd., Suwon, Rep. of Korea

[21] Appl. No.: 606,749

[22] Filed: Oct. 31, 1990

[30] Foreign Application Priority Data

Mar. 3, 1990 [KR] Rep. of Korea ............... 1990-2772

[51] Int. Cl.$^5$ ............................................. G11B 5/55
[52] U.S. Cl. ................................. 360/75; 360/78.04; 360/78.11
[58] Field of Search ................. 360/75, 78.04, 78.11

[56] References Cited

U.S. PATENT DOCUMENTS 4,599,659  7/1986  Saito ............................ 360/75
4,686,590  8/1987  Kunii et al. ................... 360/78.04
4,924,333  5/1990  Hamaoka ................... 360/78.11 X Primary Examiner—Joseph L. Dixon
Assistant Examiner—David L. Robertson
Attorney, Agent, or Firm—Robert E. Bushnell

[57] ABSTRACT

An apparatus is disclosed for sensing track zero of a floppy disc driver by detecting current flow of a stepping motor used for driving a head of a floppy disc driver. The apparatus includes a stepping motor driving unit for driving a stepping motor, a current detection unit for detecting the current of the stepping motor, a track zero sensor for providing a compared logic value by comparing the detected current with a reference voltage, a track zero sensor controller for controlling the track zero sensor, a first buffer unit for buffering the output of the track zero sensor, a second buffer for buffering a direction signal, and a track zero signal outputting unit for outputting a track zero signal by NANDing the output of the first and second buffer unit.

11 Claims, 3 Drawing Sheets

APPARATUS FOR GENERATING A TRACK ZERO SIGNAL IN A FLOPPY DISC DRIVER WITHOUT AN OPTICAL TRACK ZERO SENSOR

BACKGROUND OF THE INVENTION

The present invention relates to a track zero sensor of a floppy disc driver (FDD) which is one of peripheral equipments of a computer, particularly to a circuit being capable of detecting track zero of a floppy disc driver by means of the current detected from a stepping motor used for driving a head.

In general, a track zero sensor of the floppy disc driver, as shown in FIG. 1, includes a light emitting diode D1 and a photo transistor Q1. When a head of a disc driver shades the light beam radiated from the light emitting diode D1, the photo transistor is turned off, producing the logic low signal.

In this case, a FDD controller provides a track zero signal C1 by combining the outputs of the photo transistor Q1, a direction signal A1 and a step signal B1.

Recently, however, as FDD driving units have a tendency to be compact, thin and light, design of the FDD controller becomes simpler. Nevertheless, the conventional FDD driving apparatus shown in FIG. 1 cannot keep up with the recent tendency due to the use of photo sensors.

SUMMARY OF THE INVENTION

Therefore, it is an object of the present invention to provide a circuit for sensing track zero of a floppy disc driver by detecting current flow of a stepping motor used for driving a head of a floppy disc driver.

It is another object of the present invention to provide an integrated circuit composed of cheap units by detecting current flow of the stepping motor used for driving the head of the FDD.

According to an aspect of the present invention, a circuit for detecting track zero of a disc driver includes a stepping motor driving unit for driving a head, a current detection unit for detecting change of driving current flow of the stepping motor driving unit and outputting the detected change of driving current in a value of the voltage, a track zero sensor for providing a compared logic value by comparing an output of the current detection unit with reference voltage, the output of the current detection unit passing through a switch under the control of a control signal, a track zero sensor controller for providing a track zero sensor with a control signal for turning ON/OFF the switch when a step signal is applied thereto, a first buffer unit for buffering an output of the track zero sensor in response to the step signal, a second buffer for buffering a direction signal in response to the step signal, and a track zero signal output unit for producing a track zero signal by logic NANDing the output of the first buffer and an output of the second buffer by means of NAND gate.

BRIEF DESCRIPTION OF THE DRAWINGS

For a better understanding of the invention and to show how the same may be carried into effect, reference will now be made, by way of example, to the accompanying diagrammatic drawings, in which.

DETAILED DESCRIPTION OF THE PREFERRED EMBODIMENT

A preferred embodiment according to the present invention will now be described in detail hereinbelow, with reference to the accompanying drawings, by way of example.

Figure 1:
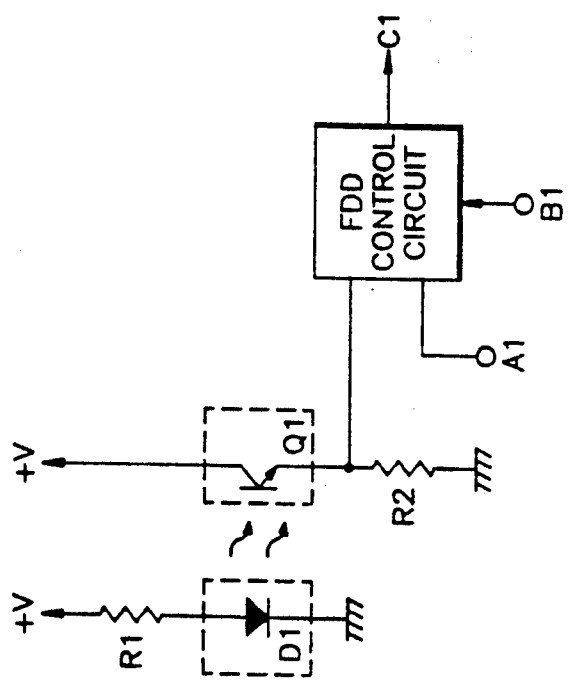
FIG. 1 illustrates the conventional track zero sensor.
Figure 2:
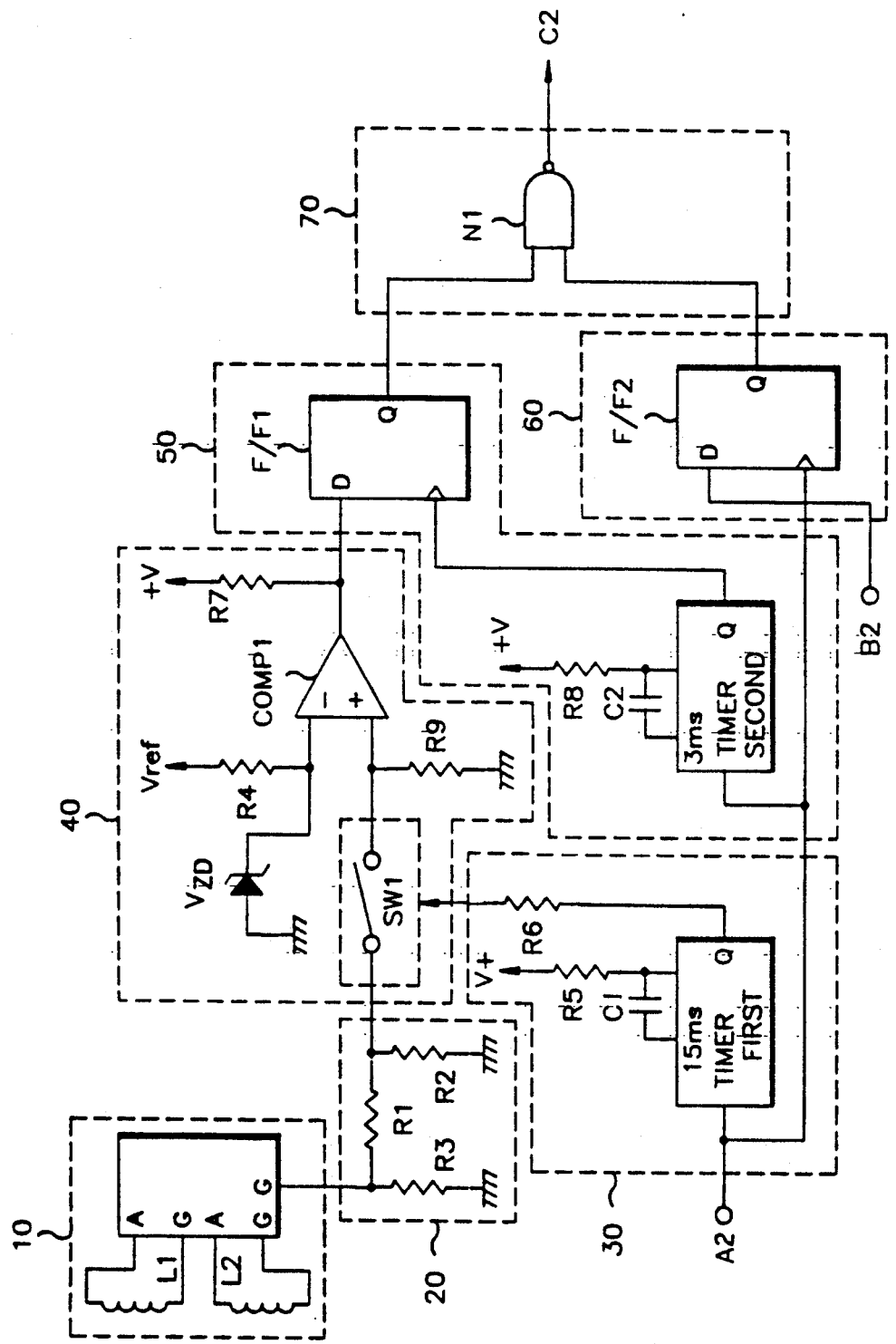
FIG. 2 illustrates a circuit of a track zero sensor embodied according to the present invention.

In FIG. 2, a stepping motor driving unit 10 drives a head, and a current detection unit 20 detects change of driving current flow of the stepping motor driving unit 10 and outputs the detected change of the driving current in a value of voltage. A track zero sensor 40 provides a compared logic value by comparing an output of the current detection unit 20 with a reference voltage, the output of the current detection unit 20 passing through a switch SW1 under the control of a control signal. A track zero sensor controller 30 provides a track zero sensor 40 with a control signal for turning ON/OFF the switch SW1 when a step signal A2 is applied thereto. A first buffer unit 50 buffers the output of the track zero sensor 40 in response to the step signal A2. A second buffer 60 buffers a direction signal B2 in response to the step signal A2. Thus, a track zero signal output unit 70 produces a track zero signal C2 by logic NANDing an output of the first buffer F/F1 and an output of the second buffer F/F2 by means of the NAND gate N1.

As shown in FIG. 2, current flow of a stepping motor while stepping is smaller than current while non-stepping(stopping). It is based on that because the stepping motor is composed of a plenty of coils, the current change induces the reverse voltage over the stepping motor.

Figure 3A:
FIGS. 3A and 3B illustrate current waveforms of a stepping motor.
Figure 3B:
Figure 3C:
FIG. 3C illustrates a composite signal waveform of the current waveforms of FIGS. 3A and 3B, and FIG. 4A to 4G illustrate operating waveforms of the track zero sensor embodied according to the present invention.

Various current waveforms of the stepping motor are shown in FIG. 3A to FIG. 3C. FIG. 3A represents a current waveform applied to the stepping motor, FIG. 3B a reverse current waveform occurred at the stepping motor, and FIG. 3C a current waveform made by compounding the above two current waveforms.

The present invention makes use of the above principles. That is, when the head comes to a track zero portion, a mechanical device disables the stepping motor to step. At this moment, current flow in the stepping motor will increase, because the reverse voltage is not developed across the stepping motor. The current change in the stepping motor brings about changing voltages across resistors R1-R3 of the current detection unit 20. The detected current changes are linked directly with change of the voltage across the resistor R3, which is inputted to positive terminal of a comparator COMP1 by way of a switch SW1. The switch SW1 is controlled by a control signal, which maintains logic high in case that the step signal A2 is more quickly inputted than a time constant determined by a resistor R5 and a capacitor C1 in the track zero sensor controller 30.

Figure 4A:
Figure 4B:
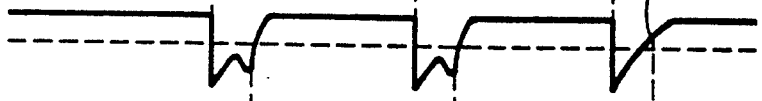
Figure 4C:
Figure 4D:
Figure 4E:
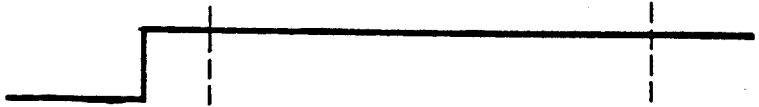
Figure 4F:
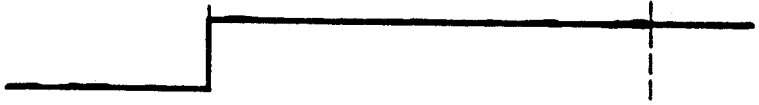
Figure 4G:
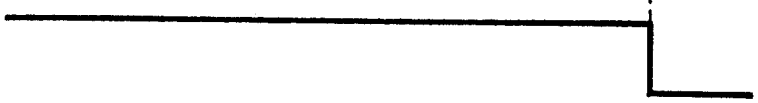

Accordingly, the switch SW1 maintains ON-state while the step control signal is applied thereto. The switch SW1 enables or disables the comparator COMP1 to operate, the comparator COMP1 detecting track zero of the disc driver only when the step signals are applied thereto. In accordance with the above described control operation of the switch SW1, the comparator COMP1, in case the current output of the current detecting unit increases as shown in a portion A of FIG. 4B, having more increased voltage of non-reverse input terminal than reference voltage $V_{ZD}$ of reverse input terminal, outputs logic high level. This logic high level signal is buffered by D-type flip-flop of the first buffer 50, and outputted as the waveform indicated in FIG. 4D. The signal from the first buffer as shown in FIG. 4D and the signal from the second buffer as shown in FIG. 4F are logically NANDed by a NAND gate N1, if the step signal A2 and the direction signal B2 as shown in FIGS. 4A and 4E. The output from the NAND gate N1 is the track zero signal as shown in FIG. 4G.

As described hereinabove, the present invention has advantages in that the circuit for sensing track zero can be integrated in compact size, since the inventive circuit introduces the current detecting unit which senses track zero by detecting the current flow of the stepping motor, and in that the price of manufacturing the circuit for sensing track zero is reduced, since the photo sensor which is applied for the conventional circuit is not required.

What is claimed is:

1. A track zero sensing circuit, of a floppy disc driver, comprising:
   a stepping motor driver for driving a head;
   a current detection circuit for detecting driving current of the stepping motor driver and for outputting a voltage value indicative of said driving current;
   a track zero sensor comprising switching means connected to receive said voltage value and selectively pass said voltage value for comparison in response to a control signal, said track zero sensor further comprising means for providing a compared logic value by comparing said voltage value when passed through said switching means;
   a track zero sensor controller for providing said switching means with said control signal for turning ON said switching means for passing said voltage value only when a step signal is applied thereto;
   first buffering means for buffering said compared logic value output from said track zero sensor in response to the step signal;
   second buffering means for buffering a direction signal in response to the step signal; and
   a track zero signal outputting means for outputting a track zero signal by logically combining an output of the first buffering means and an output of the second buffering means.

2. The track zero sensing circuit as claimed in claim 1, wherein said current detection circuit comprises:
   a first resistor connected to said stepping motor driver at a first node and connected to said switching means at a second node;
   a second resistor connected between said first node and ground; and
   a third resistor connected between said second node and ground.

3. The track zero sensing circuit as claimed in claim 2, wherein said track zero sensor controller comprises a first timer having a first predetermined time constant for generating said control signal in response to said step signal.

4. The track zero sensing circuit as claimed in claim 3, wherein said first buffering means comprises:
   a second timer having a second predetermined time constant, less than said first predetermined time constant, for generating a clock signal in response to said step signal; and
   a first flip-flop having an input terminal connected to receive said compared logic value, a clock terminal for receiving said clock signal and an output terminal for providing a buffered compared logic value signal to said track zero signal outputting means in response to said clock signal.

5. The track zero sensing circuit as claimed in claim 4, wherein said second buffering means comprises:
   a second flip-flop having an input terminal connected to receive said direction signal, a clock terminal connected to receive said step signal and an output terminal for providing a buffered direction signal to said track zero signal outputting means in response to said step signal.

6. The track zero sensing circuit as claim in claim 5, wherein said track zero signal outputting means comprises a NAND gate for outputting said track zero signal by logically combining said buffered compared logic value signal and said buffered direction signal.

7. The track zero sensing circuit as claimed in claim 1, wherein said track zero sensor controller comprises a timer having a predetermined time constant for generating said control signal in response to said step signal.

8. The track zero sensing circuit as claimed in claim 1, wherein said first buffering means comprises:
   a timer having a predetermined time constant for generating a clock signal in response to said step signal; and
   a flip-flop having an input terminal connected to receive said compared logic value, a clock terminal for receiving said clock signal and an output terminal for providing a buffered output signal to said track zero signal outputting means in response to said clock signal.

9. The track zero sensing circuit as claimed in claim 1, wherein said second buffering means comprises:
   a flip-flop having an input terminal connected to receive said direction signal, a clock terminal connected to receive said step signal and an output terminal for providing a buffered output signal to said track zero signal outputting means in response to said step signal.

10. The track zero sensing circuit as claimed in claim 1, wherein said track zero signal outputting means comprises a NAND gate for outputting said track zero signal by logically combining said output of the first buffering means and said output of the second buffering means.

11. The track zero sensing circuit as claimed in claim 1, wherein said means for providing said compared logic value comprises:
    a comparator having a first input terminal connected to receive said voltage value from said switching means and further connected to ground through a first resistor;
    said comparator having a second input terminal connected to a reference voltage through a second resistor; and
    a Zener diode connected between ground and said second input terminal.

* * * * *

UNITED STATES PATENT AND TRADEMARK OFFICE
CERTIFICATE OF CORRECTION

PATENT NO. : 5,214,544
DATED : May 25, 1993
INVENTOR(S) : Jik Kim

It is certified that error appears in the above-identified patent and that said Letters Patent is hereby corrected as shown below:

IN THE CLAIMS

Column 4,

Line 23, change "circuit as claim" to --circuit as claimed--.

Signed and Sealed this

Sixteenth Day of August, 1994

Attest:

BRUCE LEHMAN

*Attesting Officer*     *Commissioner of Patents and Trademarks*